United States Patent
Kudo

(10) Patent No.: US 7,548,634 B2
(45) Date of Patent: Jun. 16, 2009

(54) PEDESTRIAN DETECTION SYSTEM AND VEHICLE DRIVING ASSIST SYSTEM WITH A PEDESTRIAN DETECTION SYSTEM

(75) Inventor: Shinya Kudo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 393 days.

(21) Appl. No.: 11/051,590

(22) Filed: Feb. 4, 2005

(65) Prior Publication Data

US 2005/0201590 A1 Sep. 15, 2005

(30) Foreign Application Priority Data

Feb. 13, 2004 (JP) ............... 2004-036996

(51) Int. Cl.
*G06K 9/00* (2006.01)
(52) U.S. Cl. ...................... 382/103; 382/104
(58) Field of Classification Search .............. None
See application file for complete search history.

(56) References Cited

U.S. PATENT DOCUMENTS

| | | | |
|---|---|---|---|
| 5,883,968 A * | 3/1999 | Welch et al. ............... 382/100 |
| 5,963,148 A | 10/1999 | Sekine et al. |
| 6,064,629 A * | 5/2000 | Stringer et al. ............. 367/128 |
| 6,191,704 B1 | 2/2001 | Takenaga et al. |
| 6,327,536 B1 | 12/2001 | Tsuji et al. |
| 6,675,094 B2 * | 1/2004 | Russell et al. ............... 701/301 |
| 6,791,471 B2 * | 9/2004 | Wehner et al. .............. 340/903 |
| 2003/0138133 A1 * | 7/2003 | Nagaoka et al. ............. 382/104 |
| 2003/0218676 A1 | 11/2003 | Miyahara |
| 2005/0275514 A1 * | 12/2005 | Roberts ...................... 340/436 |

FOREIGN PATENT DOCUMENTS

| | | |
|---|---|---|
| DE | 101 16 277 A1 | 10/2002 |
| DE | 101 31 720 A1 | 1/2003 |
| EP | 0 400 607 A2 | 12/1990 |
| JP | 2001-18738 A | 1/2001 |
| JP | 2001-351193 A | 12/2001 |

* cited by examiner

*Primary Examiner*—Vikkram Bali
*Assistant Examiner*—Elisa M Rice
(74) *Attorney, Agent, or Firm*—Darby & Darby P.C.

(57) ABSTRACT

A stereo-image recognition unit detects a pedestrian from a solid body acquired from the image by a stereo camera and issues various warnings by outputting signals to an LED and a speaker according to the position of the pedestrian, the vehicle speed, and a signal from a turn signal switch. The unit determines whether the solid body approaches a predetermined region in the image, with one end of the solid body in the width direction being detected and the other end not being detected, and detects the width of the solid body when the other end is detected. The unit then determines whether the solid body is a pedestrian by comparing the width with a predetermined threshold. Accordingly, the unit can rapidly and reliably detect a pedestrian who approaches the vehicle traveling route and inform a driver of it and reduce an operation load necessary for detecting a pedestrian.

16 Claims, 9 Drawing Sheets

FIG.7A
FIG.7B
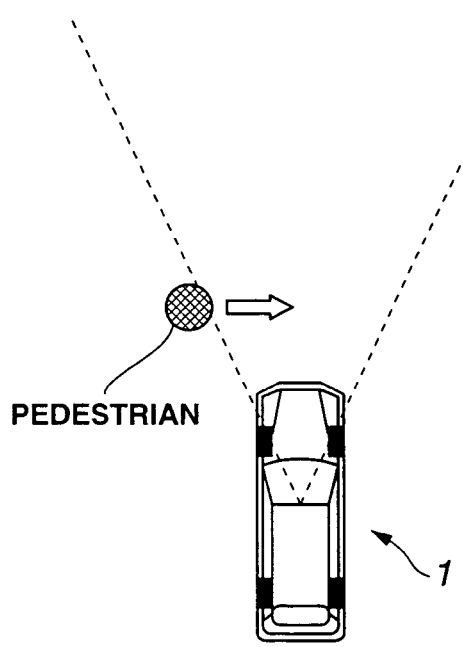
PEDESTRIAN
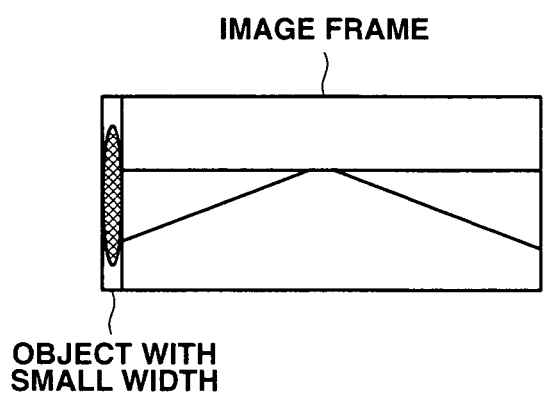
IMAGE FRAME
OBJECT WITH
SMALL WIDTH

PEDESTRIAN

IMAGE FRAME

OBJECT IN
NEXT FRAME

PEDESTRIAN

GAP   IMAGE FRAME

SOLID BODY WHOSE
WIDTH CAN BE
CALCULATED

PEDESTRIAN DETECTION SYSTEM AND VEHICLE DRIVING ASSIST SYSTEM WITH A PEDESTRIAN DETECTION SYSTEM

This application claims benefit of Japanese Application No. 2004-36996 filed on Feb. 13, 2004, the contents of which are incorporated by this reference.

BACKGROUND OF THE INVENTION

1. Field of the Invention

The present invention relates to a pedestrian detection system for accurately detecting pedestrians to assist driver's driving effectively and a vehicle driving assist system with a pedestrian detection system.

2. Description of the Related Art

Various environment-recognition sensing techniques have been developed recently for application to vehicle driving assist system and, particularly, pedestrian detection has received attention. Collisions between pedestrians and vehicles often occur because of, for example a delay in recognizing pedestrians by drivers, doing significant harm to pedestrians. Accordingly, it is required to detect pedestrians as early as possible.

For example, Japanese Unexamined Patent Application Publication No. 2001-351193 discloses a technique for determining whether pedestrians are present from features of an image in an object region, acquired from an on-board stereo camera, such as object width, longitudinal dispersion, longitudinal barycenter, vertical integrated-value distribution.

However, the pedestrian determination technique disclosed in foregoing Japanese Unexamined Patent Application Publication No. 2001-351193 is a method for detecting pedestrians present in the image. Accordingly, also the pedestrians, who need not to be detected, may be detected, such as pedestrians at rest with little possibility of entering a vehicle traveling route. Also, it is a method whereby pedestrians are detected by calculating multiple features only after the entire body of the pedestrians is present in the image, thus having the problem of a delay in determination for pedestrians who enter from the exterior of the image. Furthermore, a load applied to the calculation unit is high, since multiple features are calculated, so that processes to be installed in the calculation unit, other than the pedestrian detection process, are limited and, more advanced and higher-speed image processing is precluded since frame intervals cannot be reduced.

SUMMARY OF THE INVENTION

The present invention has been made in consideration of the above problems. Accordingly, it is an object of the present invention to provide a pedestrian detection system capable of detecting pedestrians who enter the vicinity of a vehicle traveling route rapidly and reliably and informing drivers of it accurately and reducing a calculation load necessary for detecting pedestrians and a vehicle driving assist system including the same.

A pedestrian detection system according to the present invention includes: imaging means for image picking up a front region to generate an image; solid-body recognition means for recognizing a solid body from the image; and pedestrian determination means for determining whether or not the recognized solid body is a pedestrian.

The pedestrian detection system further includes: solid-body determination means for determining whether or not a solid body a first end of which in the width direction is detected and a second end is not detected moves to a state in which the second end is detected, thereby specifying a state in which a predetermined region of the image and the solid body come close to each other; solid-body-width detection means for detecting the width of the solid body when the second end is detected; and pedestrian determination means for determining whether or not the solid body is the pedestrian by comparing the width of the solid body with a preset threshold value.

The above and other objects, features and advantages of the invention will become more clearly understood from the following description referring to the accompanying drawings.

BRIEF DESCRIPTION OF THE DRAWINGS

FIG. 7A is the explanatory diagram of a situation in which a new narrow-width object is detected at the end of the image frame, as viewed from the top;

FIG. 7B is the explanatory diagram of the image frame in the situation of FIG. 7A;

DETAILED DESCRIPTION OF PREFERRED EMBODIMENTS

An embodiment of the present invention will be described hereinbelow with reference to FIGS. 1 to 10B.

Figure 1:
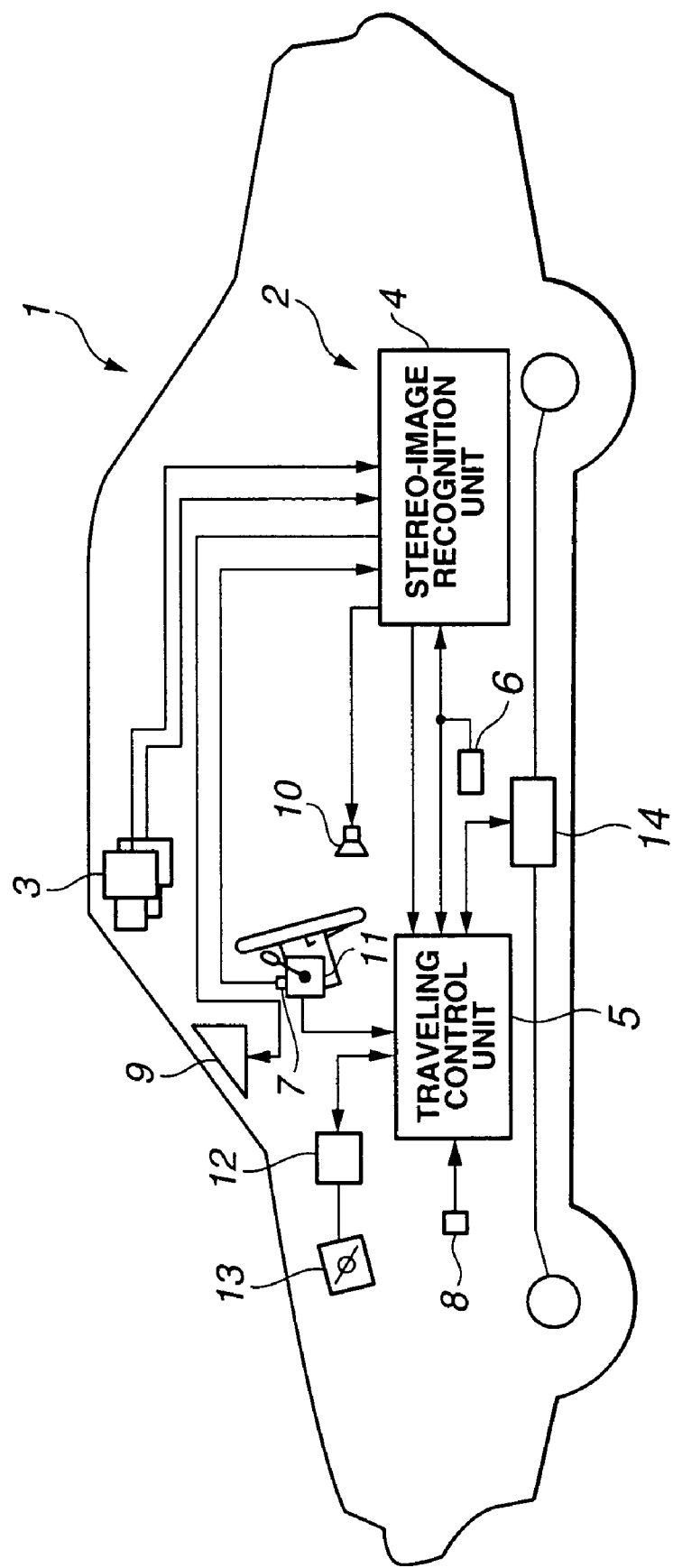
FIG. 1 is a schematic diagram of a vehicle driving assist system mounted on the vehicle according to an embodiment of the present invention.

Referring to FIG. 1, reference numeral 1 denotes a vehicle such as a car. The vehicle 1 mounts an adaptive cruise control (ACC) system 2 as an example of a vehicle driving assist system.

The ACC system 2 principally includes a stereo camera 3, a stereo-image recognition unit 4, and a running control unit 5. In the ACC system 2, in principal, the vehicle runs while maintaining the speed set by the driver in a cruise control mode in which there is no preceding vehicle; while the vehicle is under automatic follow-up control when there is the preceding vehicle.

Under the automatic follow-up control, for example, when there is the preceding vehicle, vehicle driving information is repeatedly acquired according to the operation by the driver when it is determined that the vehicle follows the preceding vehicle by the driver, thus learning target control values of the automatic follow-up control from the vehicle driving information. On the other hand, the automatic follow-up control is executed with the presence of the preceding vehicle, an automatic brake control (including a follow-up stop control), an automatic acceleration control (including a follow-up start control), etc. are performed according to the learned target control values.

The stereo camera 3 comprises a pair of (left and right) CCD cameras that uses solid-state imaging devices such as charge-coupled devices (CCDs) serving as a stereoscopic optical system. The left and right CCD cameras are mounted to the front of a ceiling of the vehicle cabin with a fixed space apart from each other, and images an object outside the vehicle in stereo. The image are outputted to the stereo-image recognition unit 4.

The vehicle 1 includes a vehicle speed sensor 6 for detecting a vehicle speed Vown. The vehicle speed Vown is outputted to the stereo-image recognition unit 4 and the travel control unit 5. A signal from a turn signal switch 7 of the vehicle is inputted to the stereo-image recognition unit 4, while the ON/OFF signal for a brake pedal from a brake switch 8 of the vehicle 1 is inputted to the travel control unit 5.

To the stereo-image recognition unit 4, the image from the stereo camera 3 and the vehicle speed Vown from the vehicle speed sensor 6 are inputted. The stereo-image recognition unit 4 acquires data on a solid body in front of the vehicle 1 and information on a region in front of a white line from the image by the stereo camera 3 to estimate a cruising route of the vehicle 1 (vehicle traveling route). The stereo-image recognition unit 4 then extracts the preceding vehicle in front of the vehicle 1 and outputs the data on preceding vehicle distance (following, or intervehicle distance) D, preceding-vehicle speed ((variation of the following distance D)+(vehicle speed Vown)) Vfwd, preceding-vehicle acceleration (differential value of the preceding-vehicle speed Vfwd) afwd, the position of a non-moving object other than the preceding vehicle, white-line coordinates, white-line recognition range, vehicle-traveling-route coordinates, etc. to the travel control unit 5.

The image by the stereo camera 3 is processed in the stereo-image recognition unit 4 as follows: Distance information for the entire image of a pair of stereo images in the environment of the vehicle 1 in a traveling direction is acquired from the deviation of corresponding positions on the principle of triangulation, which is imaged by the CCD cameras of the stereo camera 3, thus generating a distance image that shows three-dimensional distance distribution.

From the data, the stereo-image recognition unit 4 performs the known grouping process and extracts white-line data, data on sidewalls such as guardrails and curbs arranged along the roads, and data on solid bodies such as vehicles as compared with stored three-dimensional road-shape data, solid-body data, etc.

For the solid-body data, the distance to the solid body and time change of the distance (relative speed to the vehicle 1) are acquired, in which the closest vehicle on the vehicle traveling route, which cruises in substantially the same direction as the vehicle 1 at a predetermined speed, is extracted as the preceding vehicle. Of the preceding vehicles, the vehicle that comes close to the vehicle 1 at a relative speed to the vehicle 1 substantially the same speed as the vehicle speed Vown is recognized as the preceding vehicle at rest.

Figure 3:
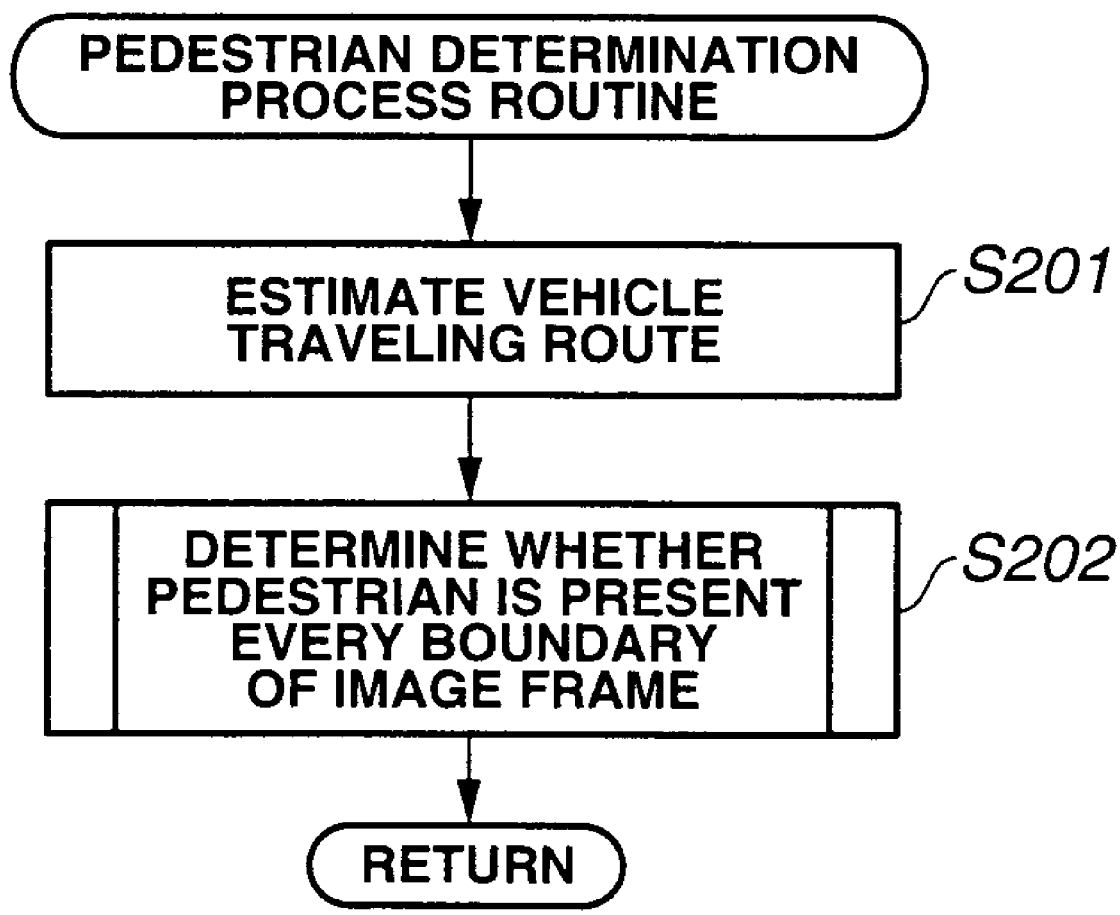
FIG. 3 is the flowchart for a pedestrian detection processing routine.
Figure 4:
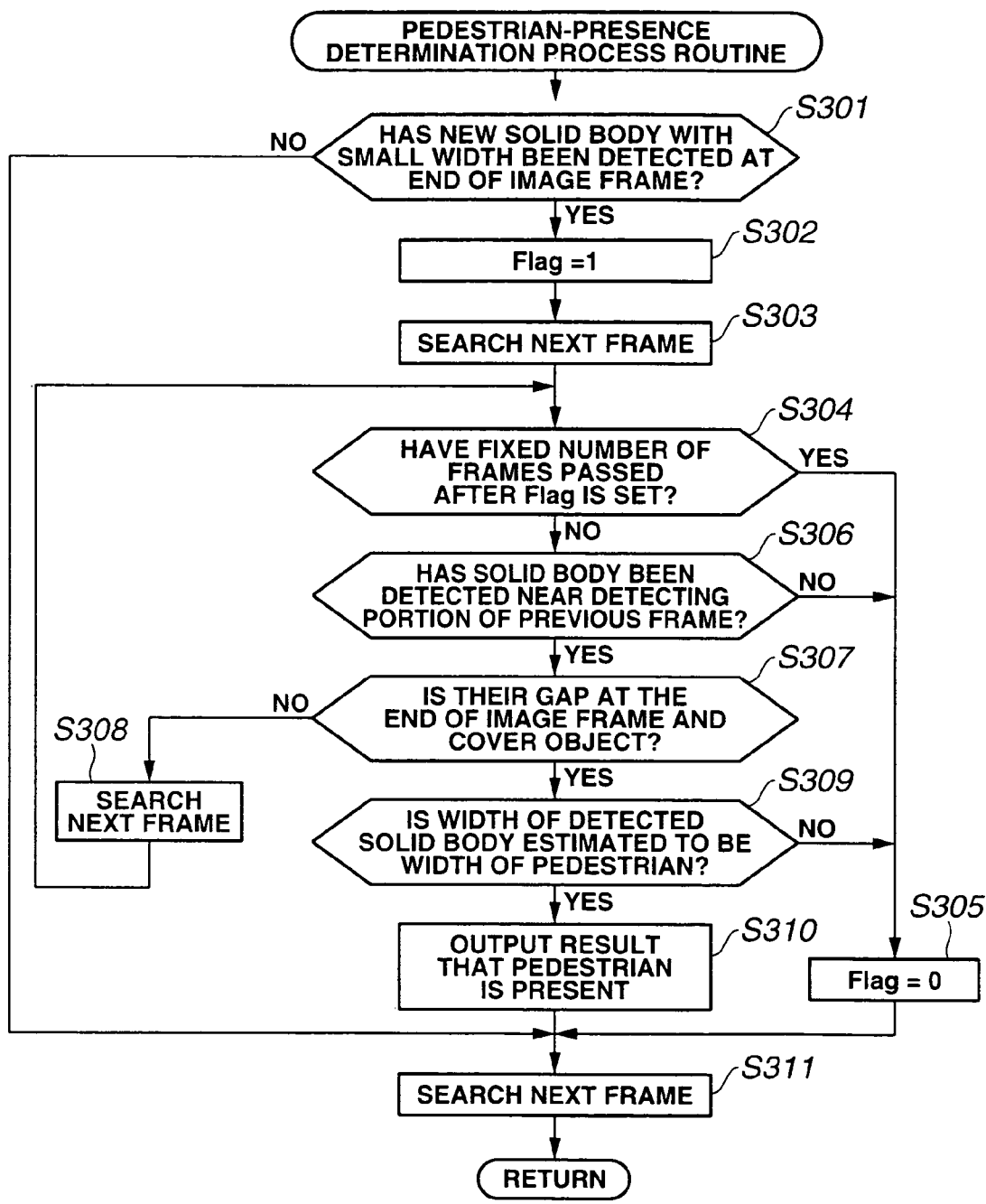
FIG. 4 is the flowchart for a pedestrian-presence determination processing routine.

The stereo-image recognition unit 4 detects the pedestrian from the solid bodies acquired from the image by the stereo camera 3 by the pedestrian detection process, shown in FIGS. 3 and 4, described later, and outputs signals to an LED 9 and a speaker 10 disposed on an instrument panel to give various warnings according to the position of the pedestrian, vehicle speed Vown at that time, the state of the signal from the turn signal switch 7. Specifically, the various warnings include a warning for attracting the driver's attention (the lighting of the LED 9 and a voice warning from the speaker 10, such as "Be alert for pedestrians") when the stereo-image recognition unit 4 has determined that there is the pedestrian, wherein when the position of the pedestrian is closer to the vehicle 1 than a predetermined range (a determination range set depending on the vehicle speed Vown). When the stereo-image recognition unit 4 has determined that the pedestrian is present, wherein when the turn signal switch 7 of the vehicle 1 is in operation, it outputs a warning of the presence of the pedestrian (the lighting of the LED 9 and the voice warning from the speaker 10 such as "Be alert for pedestrians").

Also, when the stereo-image recognition unit 4 has determined that the pedestrian is present, it outputs a signal for canceling automatic follow-up control to the travel control unit 5 of the vehicle 1 and lights up the LED 9 to give a notice that the automatic follow-up control is canceled because of the presence of the pedestrian.

Thus, in this embodiment, the stereo-image recognition unit 4 serves as pedestrian detection unit and the stereo camera 3 serves as imaging means. The stereo-image recognition unit 4 has the function of solid-body recognition means, solid-body determination means, solid-body-width detection means, and pedestrian determination means.

The travel control unit 5 achieves the function of cruise control for maintaining a running speed set by the driver and automatic follow-up control, and connects to a cruise control switch 11 including multiple switches connecting to a cruise control operation lever disposed on the side of a steering column etc., the stereo-image recognition unit 4, the vehicle speed sensor 6, the brake switch 8, etc.

The cruise control switch 11 principally includes a vehicle-speed set switch for setting a target speed during cruise control, a coast switch for principally changing the target speed downward, and a resume switch for principally changing the target speed upward. Furthermore, a main switch (not shown) for turning on/off the cruise control and the automatic follow-up control is disposed in the vicinity of the cruise control operation lever.

When the driver turns on the main switch (not shown) and sets a desired speed with the cruise control operation lever, a signal from the cruise control switch 11 is inputted to the travel control unit 5. Then a signal for converging the vehicle speed sensed by the vehicle speed sensor 6 to the speed set by the driver is outputted to a throttle-valve controller 12, where the opening degree of throttle-valve 13 is feedback-controlled, thus driving the vehicle 1 at a constant speed automatically or outputting a deceleration signal to an automatic brake controller 14 to apply an automatic brake.

The travel control unit 5 can automatically switch the control to automatic follow-up control under predetermined conditions, to be described later, when the stereo-image recognition unit 4 recognizes the preceding vehicle during constant cruise control.

In the automatic follow-up control of the travel control unit 5, the distance D between the vehicle 1 and the preceding vehicle is divided by the vehicle speed Vown to calculate the time Td between vehicles, wherein when the state in which the preceding vehicle is present with the automatic follow-up control cancelled (e.g., the main switch in OFF mode) and the time Td between vehicles is within a set value continues for a set time, the travel control unit 5 determines that the vehicle 1 is in follow-up running by the driver. When it is determined that the vehicle is in follow-up running by the driver, vehicle driving information according to the operation of the driver is repeatedly acquired and thus target control values for automatic follow-up control are learned from the vehicle driving information.

When the automatic follow-up control is executed with the main switch in ON mode, operation signals are outputted to the throttle-valve controller 12 or the automatic brake controller 13 according to the learned target control values.

The function of the cruise control and the function of the automatic follow-up control are automatically cancelled when the driver steps on the brake, when the vehicle speed Vown has exceeded a predetermined upper limit, and when an automatic follow-up control cancel signal is inputted from the stereo-image recognition unit 4.

Figure 2:
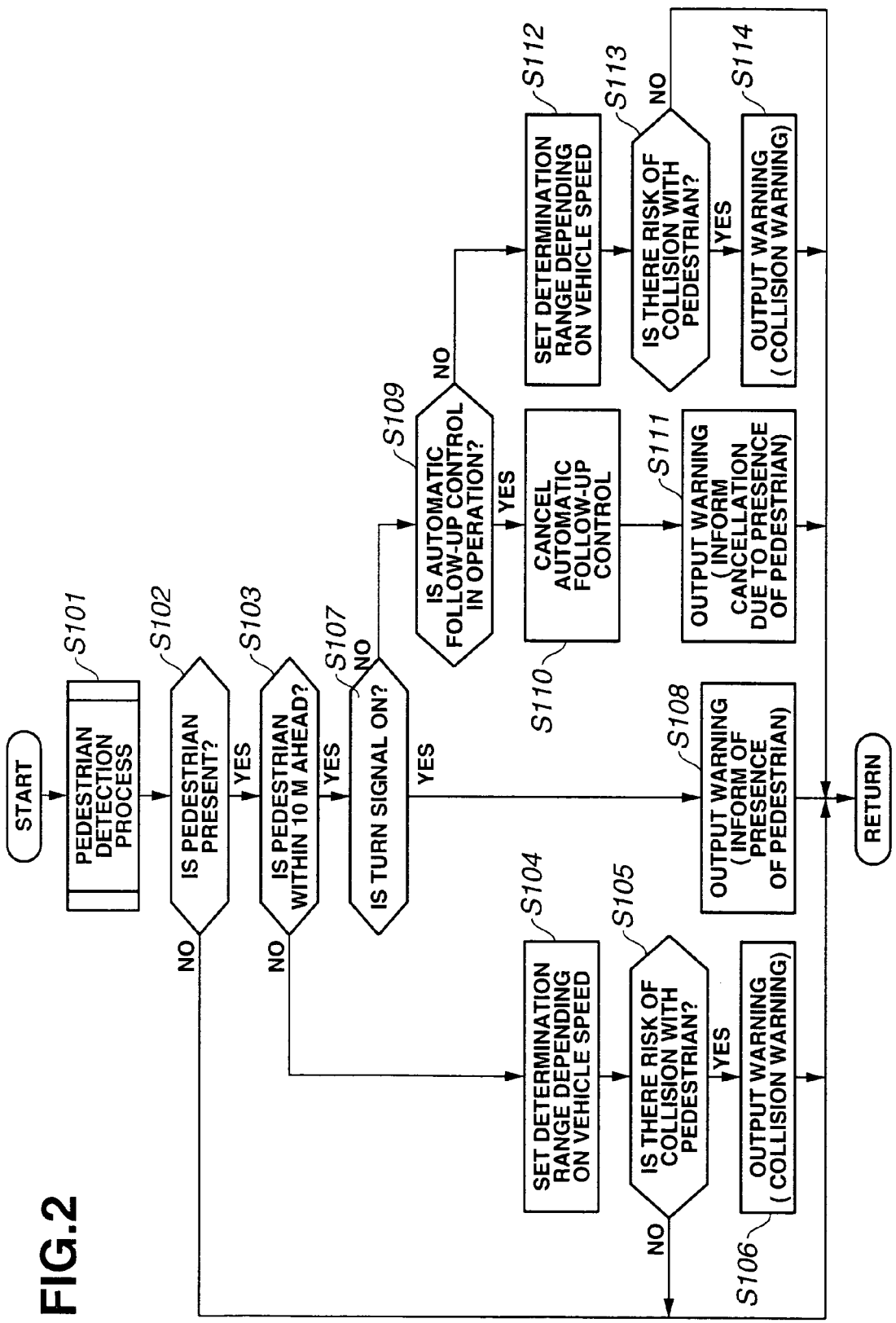
FIG. 2 is a flowchart for a vehicle driving assist program.

A vehicle driving assist program executed by the ACC system 2 will now be described with reference to the flowchart in FIG. 2. In step (hereinafter, abbreviated to S) 101, a pedestrian detection process is first executed (described later with reference to FIGS. 3 and 4). The program proceeds to S102, wherein it is determined as a result of S101 whether or not the pedestrian is present.

When it is determined in S102 that no pedestrian is present, the procedure comes out of the program; when it is determined that the pedestrian is present, the program proceeds to S103.

Figure 5:
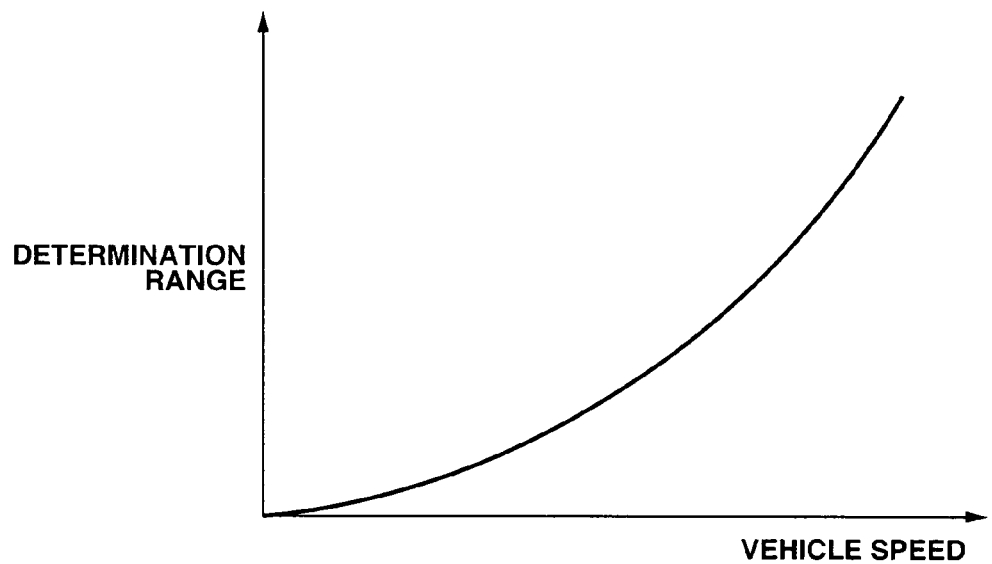
FIG. 5 is an explanatory diagram of a map of a determination range depending on vehicle speed.

When the program proceeds to S103 since the pedestrian is present, it is determined whether or not the position of the nearest pedestrian is close to the vehicle 1 (e.g., within ten meters), wherein when the pedestrian is present far from ten meters, the program proceeds to S104, where a determination range is set depending on the vehicle speed. The determination range is stored, for example, in a map and the like, as shown in FIG. 5. The range is set longer, the higher the vehicle speed is. The determination range may be corrected depending on the road surface condition (for example, road surface μ if sensed).

The program proceeds to S105, wherein the distance from the pedestrian and the determination range are compared to each other, wherein, when the pedestrian is present far from the determination range, it is determined that there is no risk of collision with the pedestrian and the procedure comes out of the program. Conversely, when the pedestrian is present within the determination range, it is determined that there is the risk of collision with the pedestrian and the program proceeds to S106, wherein the LED 9 is lit on and also the voice warning such as "Be alert for pedestrians" is outputted from the speaker 10 and the procedure comes out of the program. The LED 9 is not necessarily be lit on but may be flashed by varying the frequency depending on the distance from the pedestrian (the flashing cycle is shortened with a decreasing distance from the pedestrian). Also, the shorter the time until the pedestrian is detected by the pedestrian detection process in S101, the shorter the flashing cycle of the LED 9 may be.

Figure 6:
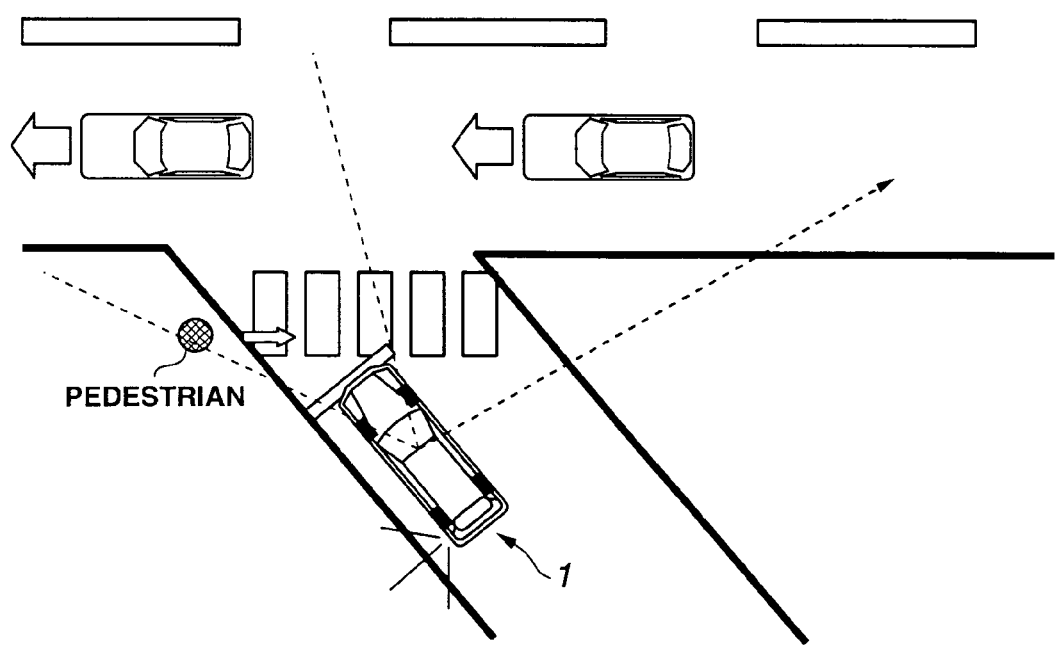
FIG. 6 is the explanatory diagram of the state of warnings with a turn signal in operation.
Figure 8A:
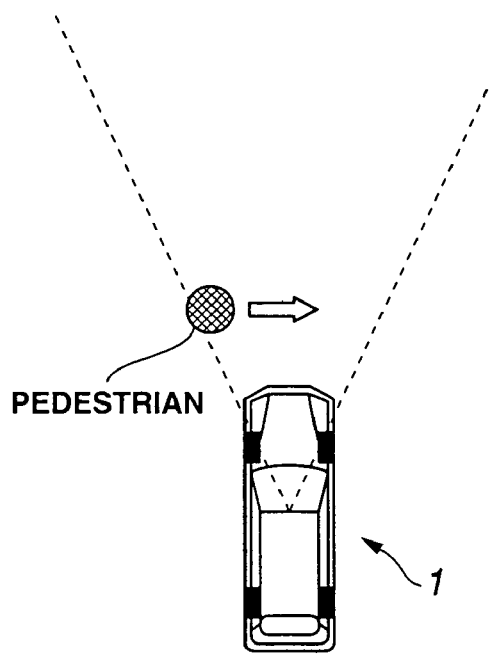
FIG. 8A is the explanatory diagram of the situation in which one end of the object is detected at the end of the image frame, and the other end is not detected, as viewed from the top.
Figure 8B:
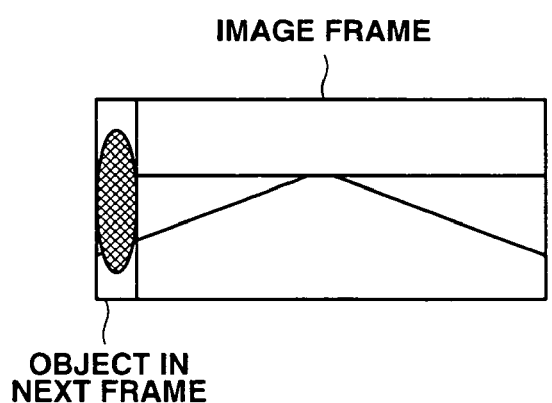
FIG. 8B is the explanatory diagram of the image frame in the situation of FIG. 8A.
Figure 9A:
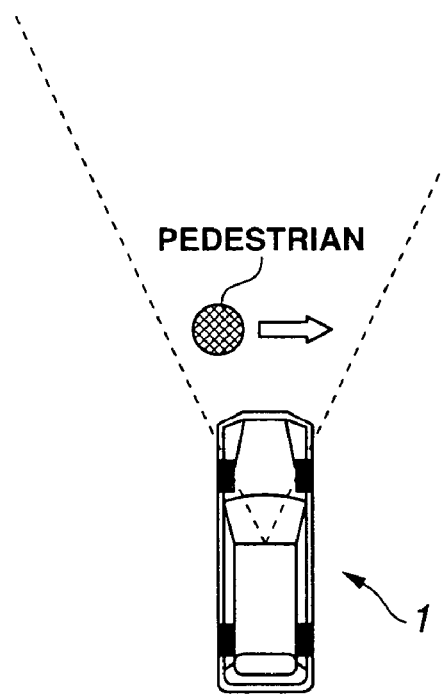
FIG. 9A is the explanatory diagram of the situation in which one end and the other end of the object are detected at the end of the image frame, as viewed from the top.
Figure 9B:
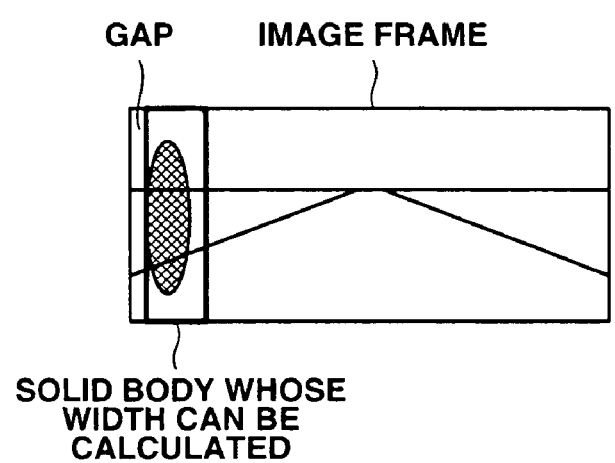
FIG. 9B is the explanatory diagram of the image frame in the situation of FIG. 9A.

On the other hand, when the pedestrian is present within ten meters ahead in S103, the program proceeds to S107, wherein it is determined whether or not the turn signal switch 7 is in ON state. As a result of the determination, when the turn signal switch 7 is in ON state, the program proceeds to S108, wherein the LED 9 is lit on to inform the driver of the presence of the pedestrian and the speaker 10 outputs the voice warning, such as "Be alert for pedestrians" and the procedure then comes out of the program. An example of this situation is shown in FIG. 6. FIG. 6 assumes a case in which the vehicle 1 is going to turn to the left. The driver's eyes are directed to see if vehicles are coming and so the risk of moving the vehicle 1 without watching out for the pedestrian who passes over a crosswalk, opposite to the driver's eyes. According to the embodiment, drivers are informed of the presence of pedestrians even in that case and so, effective driving assist is provided by giving the warning to the drivers.

As a result of the determination for the turn signal switch 7 in S107, when the turn signal switch 7 is in OFF state, the program proceeds to S109, wherein it is determined whether the vehicle 1 is operating automatic follow-up control. When the automatic follow-up control is in operation, the program proceeds to S110, wherein the automatic follow-up control is cancelled. The program then proceeds to S111, wherein the LED 9 is lit on and the driver is informed of the cancellation of the automatic follow-up control because of the presence of the pedestrian and then the procedure comes out of the program.

When it is determined in S109 that the automatic follow-up control of the vehicle 1 is not operated, the program proceeds to S112, wherein determination range according to the vehicle speed is set. Also the determination range is stored in a map and the like as shown in FIG. 5, as in S104, and set longer, the higher the vehicle speed is. The determination range may be corrected depending on the road surface condition (for example, road surface μ if sensed).

The program proceeds to S113, wherein the distance from the pedestrian and the determination range are compared to each other, wherein, when the pedestrian is present far from the determination range, it is determined that there is no risk of collision with the pedestrian and the procedure comes out of the program. Conversely, when the pedestrian is present within the determination range, it is determined that there is the risk of collision with the pedestrian and the program proceeds to S114, wherein the LED 9 is lit on and also the voice warning such as "Be alert for pedestrians" is outputted from the speaker 10 and then the procedure comes out of the program. The LED 9 is not necessarily be lit on but may be flashed by varying the frequency depending on the distance from the pedestrian (the flashing cycle is shortened with a decreasing distance from the pedestrian). Also, the shorter the time until the pedestrian is detected, the shorter the flashing cycle of the LED 9 may be.

The pedestrian detection process of S101 will then be described with reference to the flowchart of FIG. 3. In S201, the vehicle traveling route (a predetermined region in the image) is estimated from the image by the stereo camera 3. The vehicle traveling route is estimated as follows: The three-dimensional coordinate system in the actual space is shown as the coordinate system peculiar to the vehicle 1, wherein the lateral (width) direction of the vehicle 1 is indicated by the X-coordinate, the vertical direction of the vehicle 1 is indicated by the Y-coordinate, and the longitudinal direction of the vehicle 1 is indicated by the Z-coordinate. The right side of the vehicle 1 is set as the plus side of the X-axis, the portion above the vehicle 1 is set as the plus side of the Y-axis, and the portion in front of the vehicle 1 is set as the plus side of the Z-axis, with the road surface immediately below the center of the two CCD cameras of the stereo camera 3 as the origin.

a. Estimating Vehicle Traveling Route from White Line: When data on both of the left and right side white lines or on either of them is acquired, and from which the shape of the lane of the vehicle 1 can be estimated, the vehicle traveling route is made parallel with the white line in consideration of the width of the vehicle 1 and the position of the vehicle 1 in the current lane.

b. Estimating Vehicle Traveling Route from Sidewall Data such as Guardrails and Curbs: When data on both of the left and right side sidewalls or on either of them is acquired, and from which the shape of the lane of the vehicle 1 can be estimated, the vehicle traveling route is made parallel with the sidewall in consideration of the width of the vehicle 1 and the position of the vehicle 1 in the current lane.

c. Estimating Vehicle Traveling Route from Track of Preceding Vehicle: The vehicle traveling route is estimated from the past trace of the preceding vehicle, extracted from solid-body data.

d. Estimating Vehicle Traveling Route from Trace of Vehicle 1: The vehicle traveling route is estimated from the running conditions of the vehicle 1. For example, the vehicle traveling route is estimated from a yaw-rate γ, the vehicle speed Vown, a steering-wheel angle θH (the yaw-rate γ and the steering-wheel angle θH are acquired from a sensor (not shown)) as follows:

It is first determined whether the yaw-rate sensor is operative, wherein when it is operative, a current turning curvature Cua is calculated from the following equation (1):

$$Cua = \gamma / Vown \qquad (1)$$

On the other hand, when the yaw-rate sensor is inoperative, it is determined whether or not the vehicle is steered at a steering angle δ, obtained from the steering-wheel angle θH, of 0.57 degrees or more. When the steering angle δ is 0.57 degrees or more, the current turning curvature Cua is calculated using the steering angle δ and the vehicle speed Vown, e.g., from equations (2) and (3).

$$Re = (1 + A \cdot Vown^2) \cdot (L/\delta) \qquad (2)$$

$$Cua = 1/Re \qquad (3)$$

where Re is the turning curvature, A is a stability factor of the vehicle, and L is a wheel base.

When the steering angle δ is smaller than 0.57, the current turning curvature Cua is 0 (in straight driving).

Thus mean turning curvature is calculated from the turning curvature of past predetermined time (e.g., 0.3 sec.), to which the obtained current turning curvature Cua is added, to estimate the vehicle traveling route.

Even when the current turning curvature Cua is calculated by the following equation (1), with the yaw-rate sensor in operation, wherein when the steering angle δ is smaller than 0.57 degrees, the current turning curvature Cua may be corrected to 0 (straight driving mode).

The program then proceeds to S202, wherein it is determined for every left and right boundaries of the image frame for detecting solid bodies whether the pedestrian is present.

The pedestrian-presence determination process executed every boundaries of the image frame will be described with reference to the flowchart of FIG. 4. In S301, it is determined whether or not a new solid body with narrow width (e.g., a width from 10 to 300 mm) has been detected at the end of the current image frame.

When it is determined in S301 that the new solid body with narrow width cannot be detected at the end of the current image frame, the program jumps to S311, wherein the next frame is searched and the program then comes out of the routine.

Conversely, when it is determined in S301 that the new solid body with narrow width is detected at the end of the current image frame, the program proceeds to S302, wherein a flag Flag is set (Flag=1). The program moves to S303, wherein the next frame is searched, and the program proceeds to S304. FIGS. 7A and 7B show an example in which the pedestrian enters forward of the vehicle 1 from the left front relative to the vehicle 1. In that case, as shown in FIG. 7B, the pedestrian is recognized as an object with narrow width on the left of the image frame.

The program then moves to S304, wherein it is determined whether or not a specific number of frames, or a fixed time (e.g., eight frames at a 100-msec interval, 0.7 sec) has passed after the flag Flag is set in searching the next frame. When the specific number of frames (the fixed time) has passed, the program proceeds to S305, wherein the flag Flag is cleared (Flag=0), and the program jumps to S311, wherein the next frame is searched and then the program comes out of the routine. In other words, when the state shown in FIGS. 7A and 7B or FIGS. 8A and 8B has passed by the specific number of frames (the fixed time), it is determined that the solid body is not the object coming close to the vehicle 1 (or the solid body at rest).

Figure 10A:
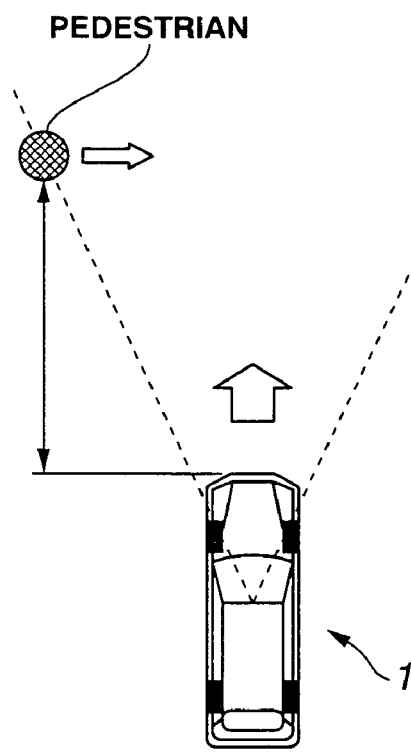
FIG. 10A is the explanatory diagram of an example of a solid-body detected position in the preceding frame.
Figure 10B:
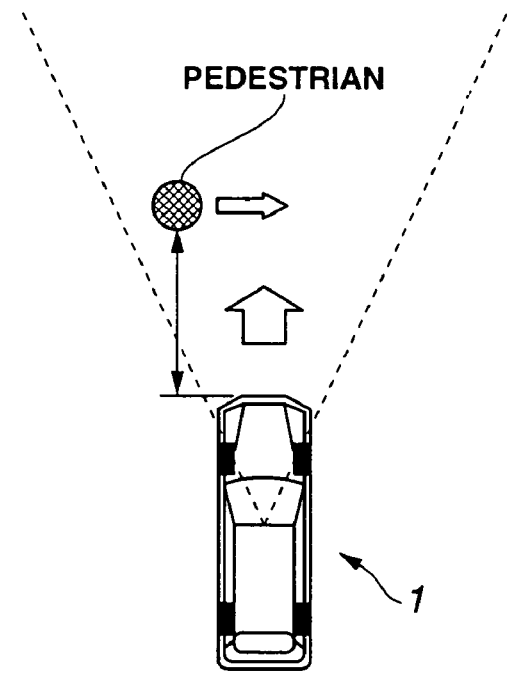
FIG. 10B is the explanatory diagram of the example of the solid-body detected position in the present frame following that of FIG. 10A.

When it is determined in S304 that the specific number of frames (the fixed time) has not passed after the flag Flag has been set in searching the next frame, the program proceeds to S306, wherein it is determined whether or not the solid body has been detected again in the vicinity of the portion where the solid body was detected in the preceding frame. The vicinity of the portion where the solid body was detected in the preceding frame varies depending on the moving speed of the vehicle 1. Specifically, as shown in FIGS. 10A and 10B, when the vehicle 1 is moving, the distance between the vehicle 1 and the pedestrian varies depending on the vehicle speed Vown. Accordingly, the vehicle speed is corrected by multiplying the vehicle speed Vown by a sampling time Δt (Vown·Δt), considering the difference of the detection positions. More specifically, the distance to the solid-body detected position in the current frame relative to the distance to the solid-body detected position in the preceding frame decreases as the vehicle speed Vown increases. The solid body is determined as the identical object when the difference from the preceding detected position is within ±300 mm in consideration of detection error, positional change of the solid body.

When it is determined in S306 that no solid body can be detected in the vicinity of the solid-body detected portion in the preceding frame, it is determined that the preceding detected solid body is due to an error or is not an approaching object, and the program proceeds to S305, wherein the flag Flag is cleared (Flag=0). The program then jumps to S311, wherein the next frame is searched and then the program comes out of the routine.

When it is determined in S306 that the solid body can be detected in the vicinity of the solid-body detected portion in the preceding frame, the program proceeds to S307, wherein it is determined whether or not a gap has been detected at the end of the image frame, that is, whether or not the solid body has moved to a state in which the other end can be imaged.

When it is determined in S307 that no gap is detected at the end of the image frame, the program proceeds to S308, wherein the next frame is searched and then the procedure from S304 is repeated. When the gap is detected at the end of the image frame (e.g., the case shown in FIGS. 9A and 9B), the program proceeds to S309.

The state in which the solid body adjacent to the image frame, only one end of which is imaged, shifts to the state in which the other end is also imaged is either the state in which the solid body is moving toward the vehicle traveling route or the state in which the vehicle 1 turns to change in the direction that the vehicle traveling route is closer to the solid object. Accordingly, it can be determined whether or not the cruising route of the vehicle 1 and the object are getting closer to each other by determining whether or not the solid object has moved from the state in which only one end is imaged to the state in which the other end is imaged.

In S309, it is determined whether or not the width of the detected solid body can be estimated to be that of the pedestrian (e.g., from 300 to 800 mm), wherein it can be estimated to be the width of the pedestrian, the program proceeds to S310, wherein the result that the pedestrian is present is outputted. The program then moves to S311, wherein the next frame is searched and the program comes out of the routine.

When it is determined in S309 that it cannot be estimated to be the width of the pedestrian, the program proceeds to S305, wherein the flag Flag is cleared (Flag=0) and then jumps to S311, wherein the next frame is searched and the program comes out of the routine.

Thus, according to the embodiment of the invention, it is determined whether or not the pedestrian is present as soon as the gap is detected at the end of the image frame. This allows the approach of the pedestrian to be sensed accurately and rapidly and also offers high reliability. Also, this prevents the collision due to oversight at right or left turns at intersections or in other cases by calling driver's attention with warnings of the presence of pedestrians.

Also, particularly for automatic cruise control in which the vehicle is followed up automatically to preceding vehicles during traffic congestion, pedestrians who cross between vehicles during traffic congestion can be detected rapidly. Thus, the automatic cruise control is cancelled and so automatic start-up of the vehicle becomes impossible, so that the collision with pedestrians can be reliably prevented.

Furthermore, the embodiment eliminates unnecessary calculation of image data, thus reducing the load on the calculation unit to speed up the processing. This allows higher accurate image processing, higher detection speed, and multiprocessing operation owing to the reduction of frame intervals, and also cost reduction by introducing a low-performance processing unit.

The foregoing embodiment has been described for an example in which the determination is made on whether or not the solid body adjacent to the left and right boundaries of the image frame and only one end of which is detected is the pedestrian. However, the present invention is not limited to that but it is also possible to extract a non-moving solid body which is present in front of the vehicle 1 as a cover object and determine whether or not the solid body only one end of which is detected from the side of the cover object is the pedestrian. Specifically, the non-moving solid body present in the region outside the width of the vehicle traveling route is extracted as the cover object and then the solid body adjacent to the cover object on the vehicle traveling route side, only one end of which is detected, is extracted. The cover object and the solid body are extracted for each of the left and right regions of the vehicle traveling route. To determine whether the extracted solid body is the object that approaches the vehicle traveling route, the determination is made on whether or not the gap has been detected between the solid body and the cover object, that is, whether or not the solid body moves to the state in which the other end of the solid body can also be detected. Then it is determined from the width of the solid body whether or not the solid body is the pedestrian, as in the above-described embodiment. This allows rapid detection of the pedestrian who appears from the back of the cover object, making it difficult for drivers to recognize. This also prevents the collision by drawing driver's attention with warnings of the presence of the pedestrian, as in the foregoing embodiment.

The warning of the presence of the pedestrian of the foregoing embodiment has been described for the warning by the flashing of the LED 9 disposed on the instrument panel and the voice warning from the speaker 10. However, the invention is not limited to that but, for example, the driver may be informed of the presence of the pedestrian in such a manner that the image is displayed on a display disposed at a position that the driver can view and a colored panel is superposed on the portion of the detected pedestrian.

According to the present invention, as described above, the pedestrian who enters the vicinity of the vehicle traveling route can be detected rapidly and reliably and the driver can be informed of it accurately and also an operating load necessary for detecting the pedestrian can be reduced.

Having described the preferred embodiments of the invention referring to the accompanying drawings, it should be understood that the present invention is not limited to those precise embodiments and various changes and modifications thereof could be made by one skilled in the art without departing from the sprit or scope of the invention as defined in the appended claims.

What is claimed is:

1. A pedestrian detection system comprising:
   imaging means for image picking up a front region to generate an image;
   solid-body recognition means for recognizing a solid body from the image;
   solid-body determination means for determining whether or not a first condition in which a solid body a first end of which in the width direction is detected and a second condition in which a second end is not detected shifts to a third condition in which the second end is detected, the first condition occurring only when part of the solid body falls within the image, the third condition occurring when the entire solid body in the width direction appears within the image, and for specifying a state in which a predetermined region of the image and the solid body come close to each other when the shift from the second condition to the third condition is detected after detecting the first condition;
   solid-body-width detection means for detecting the width of the solid body when the second end is detected; and
   pedestrian determination means for determining whether or not the solid body is a pedestrian by comparing the width of the solid body with a preset threshold value.

2. The pedestrian detection system according to claim 1, wherein the solid-body determination means determines that the solid body is not an approaching object when the second condition continues over a preset time after the first end of the solid object is first detected in the predetermined region.

3. The pedestrian detection system according to claim 1, wherein the solid-body determination means determines whether or not the solid body appearing from at least one of the left and right boundaries of a process image frame, the image frame being set in advance, is the approaching object.

4. The pedestrian detection system according to claim 2, wherein the solid-body determination means determines whether or not the solid body appearing from at least either of the left and right boundaries of the process image frame, the image frame being set in advance, is the approaching object.

5. A vehicle driving assist system comprising the pedestrian detection system according to claim 1, wherein when the pedestrian detection system has determined that the pedestrian is present, a warning is outputted when the position of the pedestrian is closer to the vehicle than a predetermined distance.

6. A vehicle driving assist system comprising the pedestrian detection system according to claim 2, wherein when the pedestrian detection system has determined that the pedestrian is present, the warning is outputted when the position of the pedestrian is closer to the vehicle than the predetermined distance.

7. A vehicle driving assist system comprising the pedestrian detection system according to claim 3, wherein when the pedestrian detection system has determined that the pedestrian is present, the warning is outputted when the position of the pedestrian is closer to the vehicle than the predetermined distance.

8. A vehicle driving assist system comprising the pedestrian detection system according to claim 4, wherein when the pedestrian detection system has determined that the pedestrian is present, the warning is outputted when the position of the pedestrian is closer to the vehicle than the predetermined distance.

9. A vehicle driving assist system comprising the pedestrian detection system according to claim 1, wherein when the pedestrian detection system has determined that the pedestrian is present, the warning of the presence of the pedestrian is outputted only when a turn signal switch of the vehicle is in operation.

10. A vehicle driving assist system comprising the pedestrian detection system according to claim 2, wherein when the pedestrian detection system has determined that the pedestrian is present, the warning of the presence of the pedestrian is outputted when the turn signal switch of the vehicle is in operation.

11. A vehicle driving assist system comprising the pedestrian detection system according to claim 3, wherein when the pedestrian detection system has determined that the pedestrian is present, the warning of the presence of the pedestrian is outputted when the turn signal switch of the vehicle is in operation.

12. A vehicle driving assist system comprising the pedestrian detection system according to claim 4, wherein when the pedestrian detection system has determined that the pedestrian is present, the warning of the presence of the pedestrian is outputted when the turn signal switch of the vehicle is in operation.

13. A vehicle driving assist system comprising the pedestrian detection system according to claim 1, wherein when the pedestrian detection system has determined that the pedestrian is present, wherein when a follow-up control is in operation so that the vehicle follows the preceding vehicle, the follow-up control is cancelled.

14. A vehicle driving assist system comprising the pedestrian detection system according to claim 2, wherein when the pedestrian detection system has determined that the pedestrian is present, wherein when the follow-up control is in operation so that the vehicle follows the preceding vehicle, the follow-up control is cancelled.

15. A vehicle driving assist system comprising the pedestrian detection system according to claim 3, wherein when the pedestrian detection system has determined that the pedestrian is present, wherein when the follow-up control is in operation so that the vehicle follows the preceding vehicle, the follow-up control is cancelled.

16. A vehicle driving assist system comprising the pedestrian detection system according to claim 4, wherein when the pedestrian detection system has determined that the pedestrian is present, wherein when the follow-up control is in operation so that the vehicle follows the preceding vehicle, the follow-up control is cancelled.

\* \* \* \* \*